United States Patent [19]

Owen

[11] 4,444,722

[45] Apr. 24, 1984

[54] SYSTEM FOR REGENERATING FLUIDIZABLE CATALYST PARTICLES

[75] Inventor: Hartley Owen, Belle Mead, N.J.

[73] Assignee: Mobil Oil Corporation, New York, N.Y.

[21] Appl. No.: 96,105

[22] Filed: Nov. 20, 1979

Related U.S. Application Data

[60] Division of Ser. No. 742,806, Nov. 18, 1976, abandoned, which is a continuation-in-part of Ser. No. 479,726, Jun. 17, 1974, abandoned.

[51] Int. Cl.³ .............................. B01J 8/26; B01J 8/32
[52] U.S. Cl. .................................... 422/144; 422/145; 422/223
[58] Field of Search ................................ 422/142–145, 422/212, 219, 223; 208/164; 252/417

[56] References Cited

U.S. PATENT DOCUMENTS

| | | | |
|---|---|---|---|
| 2,902,432 | 9/1959 | Codet et al. | 252/417 |
| 3,821,103 | 6/1974 | Owen et al. | 252/417 |
| 3,893,812 | 7/1975 | Conner et al. | 252/417 |
| 3,926,778 | 12/1973 | Owen et al. | |

*Primary Examiner*—Bradley Garris
*Attorney, Agent, or Firm*—Charles J. Speciale; Michael G. Gilman; Alexander J. McKillop

[57] ABSTRACT

A hydrocarbon conversion-catalyst regeneration operation is described which relies upon an upflowing fluid catalyst mass generally decreasing in density of catalyst particles superimposed by an upflowing more dispersed catalyst phase undergoing catalyst regeneration and combustion of combustible materials to effect elevated temperature regeneration of catalyst deactivated by hydrocarbonaceous material under conditions providing low CO levels in the flue gas and generally less than 0.15 mol percent in the flue gas separated from regenerated catalyst particles. Regenerated catalyst at an elevated temperature of regeneration is mixed with spent catalyst recovered from hydrocarbon conversion in a first contact zone in the presence of a fluidizing gas to obtain an initial mix temperature of at least 1175° F. before contact with a secondary oxygen containing regeneration gas stream in a more dense catalyst phase as a part of the upflowing fluid catalyst mass. The ratio of hot regenerated catalyst to spent catalyst is restricted to obtain a mix temperature particularly promoting the combustion of hydrocarbonaceous material with oxygen containing gas in the upflowing catalyst phases comprising dense and dispersed catalyst phase so as to recover catalyst discharge from said uppermost dispersed catalyst phase at a temperature of at least 1350° F.

4 Claims, 1 Drawing Figure

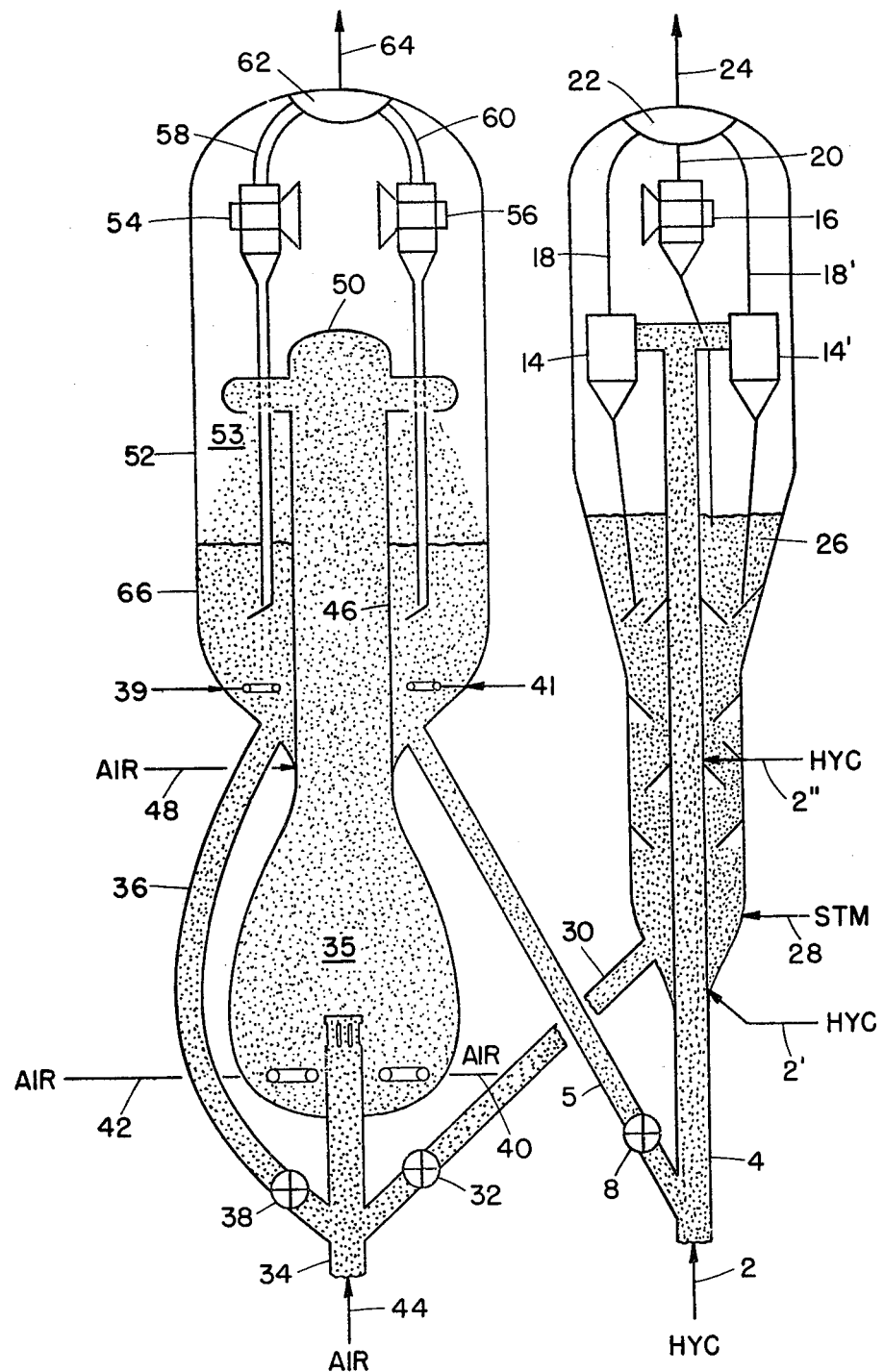

SYSTEM FOR REGENERATING FLUIDIZABLE CATALYST PARTICLES

This Application is a division of copending application Ser. No. 742,806 filed Nov. 18, 1976 as a is a Continuation-In-Part of Ser. No. 479,726, filed on June 17, 1974, both now abandoned.

BACKGROUND OF THE INVENTION

The field of catalytic cracking and particularly fluid catalyst operations have undergone significant development improvements due primarily to advances in catalyst technology and product distribution obtained therefrom. With the advent of high activity catalyst and particularly crystalline zeolite cracking catalysts, new areas of operating technology have been encountered requiring even further refinements in processing techniques to take advantage of the high catalyst activity, selectivity and operating sensitivity. The present invention therefore is concerned with a combination operation comprising hydrocarbon conversion and regeneration of the catalyst employed therein. In a particular aspect the present invention is concerned with the technique of regenerating a low coke producing crystalline zeolite hydrocarbon conversion catalyst containing deactivating deposits of carbonaceous material.

SUMMARY OF THE INVENTION

The present invention relates to the conversion of hydrocarbon feed materials in the presence of high activity fluidizable crystalline zeolite containing catalyst particles and the regeneration of the catalyst particles to remove deactivating coke deposits by burning. In a more particular aspect the present invention is concerned with the method and system for regenerating fluidizable catalyst particles and particularly a crystalline zeolite containing cracking catalyst initially containing carbonaceous deposits under more efficient regenerating conditions promoting the recovery of heat available through the burning of combustible material including the carbonaceous deposits of a hydrocarbon conversion operation. In yet another aspect, the invention is concerned with the method and apparatus for obtaining a particular relationship of operating parameters coupled in a manner promoting a suspended catalyst phase removal of deactivating deposits of carbonaceous material for high activity hydrocarbon conversion catalyst particles and heating thereof to an elevated temperature.

In one aspect of the hydrocarbon conversion-catalyst regeneration system of the present invention, a relatively dense fluid upflowing catalyst mass in open communication there above with an upflowing more dispersed phase catalyst regeneration operation in apparatus resembling a bud vase in cross section is employed for effecting a relatively high temperature regeneration of catalyst particles and combustion of formed carbon monoxide. Regenerated catalyst recovered from the dispersed catalyst phase regeneration section is collected and transferred to an adjacent riser hydrocarbon conversion operation wherein conversion of a hydrocarbon feed such as gas oil with or without either of higher and lower boiling materials such as gaseous $C_5$ minus hydrocarbons; lower alcohols, such as, methanol; residual oils and heavy recycle products of catalytic cracking as well as hydrogenated feeds is accomplished with the hot regenerated cracking catalyst at a temperature of at least about 900° F.

The catalyst employed in the operation of this invention is preferably a high activity crystalline zeolite catalyst of fluidizable particle size which is transferred in suspended phase condition through one or more riser conversion zones providing a hydrocarbon residence time in the range of 0.5 to about 10 seconds and more usually less than about 8 seconds. High temperature riser conversions at temperatures of at least 1000° F. and a hydrocarbon residence time up to 10 seconds but more usually from 1 to 8 seconds hydrocarbon residence time is not unusual and desirable for some operations before separating vaporous hydrocarbon materials comprising hydrocarbon conversion products from suspended catalyst. Cyclonic separation of catalyst from hydrocarbons is particularly desirable for separating and restricting the hydrocarbon residence time with catalyst particles. During the hydrocarbon conversion step, carbonaceous deposits accumulate on the catalyst particles and the particles entrain some hydrocarbonaceous material upon removal from the catalyst cyclonic separation step. The entrained hydrocarbonaceous material is thereafter partially removed with stripping gas in a separate catalyst stripping zone. Hydrocarbon conversion products separated from the catalyst including stripped materials are usually combined and passed to a common product fractionation step. Stripped catalyst containing deposited deactivating amounts of carbonaceous material hereinafter referred to as coke is then passed to the catalyst regeneration operation of the present invention.

The regeneration technique, system and apparatus of the present invention is unique in many respects for accomplishing an efficient removal of carbonaceous material or coke deposits from the catalyst particles. Maximizing the recovery of heat available through the coke removal operation of this invention is particularly desirable. The regeneration technique and apparatus of this invention relies upon controlling the formation of an initial mix of deactivated catalyst with hot regenerated catalyst to provide a predetermined mix ratio and temperature of at least 1175° F. which is discharged from a riser mix zone into the lower portion of an upflowing relatively dense fluid mass of catalyst in the lower bulb portion of the regeneration zone. A relatively high temperature profile is maintained in the catalyst regeneration apparatus combination of this invention in which the concentration of catalyst particles in regeneration gas varies considerably and is generally in the range of from about 1 to 40 lbs/cu.ft. but preferably it is as low as about 1.5 lbs/cu.ft. in the upper portion of the dispersed catalyst phase regeneration section. The regeneration gas velocity in the upflowing mass of catalyst is preferably at least 3 ft./sec. to obtain the desired upward catalyst flow particularly in the more restricted upper portion of the regeneration zone of smaller diameter. The restricted regeneration section may be tapered and of smaller diameter in the upper portion than in the lower portion. The regeneration zone and apparatus resembles a bud vase in cross section in its major portion to which the catalyst mix is introduced by a relatively short riser means.

The high temperature profile of the regeneration operation is initially obtained and promoted by the mixing of hot regenerated catalyst with stripped deactivated carbon containing catalyst in the lower portion of a relatively short conduit means or riser mixing zone in proportions or ratios to provide an initial catalyst mix temperature of at least 1175° F. and preferably about 1200° F. The catalyst mixture thus formed is contacted with preheated oxygen containing regeneration gas such as air under conditions to form a suspension and initiate combustion of carbonaceous deposits as the suspension passes upwardly through the riser mixer conduit. Thus, in the system of the present invention a required amount of hot regenerated catalyst mixed with coke deactivated catalyst to form a mix temperature of at least 1175° F. in the riser is conveyed with oxygen containing gas and discharged generally radially into the lower portion of the relatively dense fluid mass of catalyst undergoing regeneration in the bottom enlarged portion of the regenerator. The riser mixer is provided in a specific arrangement with a plurality of elongated openings in the upper periphery of the riser and beneath the capped upper end thereof to effect the radial discharge of the suspension into the more dense fluid bed phase. However, other apparatus arrangements which will accomplish this result may also be employed. Additional regeneration gas at an elevated temperature is passed into the lower bottom portion of the dense catalyst mass beneath the riser outlet of the mixing zone if desired. In the dense fluid catalyst mass section of the catalyst regeneration operation, sufficient oxygen containing regeneration gas or air is added to the lower portion of the catalyst thereby causing it to move generally upwardly through the regeneration zone from the dense mass through the dispersed catalyst phase section thereabove of reduced cross-sectional area. Provision is also made for adding supplemental oxygen containing regeneration gas as required to one or more sections of the upwardly flowing catalyst in the regeneration zone to promote the conversion of CO to $CO_2$. In this arrangement, it has been found that too high a particle density in the upflowing dispersed catalyst phase may operate to quench the conversion of CO to $CO_2$ desired to be accomplished before discharge from the riser regenerator into the enlarged catalyst settling zone. However, maintaining a particle density in the suspended catalyst phase below about 8 lbs/cu.ft. and more usually below about 5 and particularly 3 lbs/cu.ft. permits combustion of CO in an upper portion of the restricted diameter riser regeneration section. Combustion of material in the upper portion of the enlarged settling section under even lower catalyst particle density conditions is generally not desirable or needed in the arrangement of this invention.

The riser regeneration zone or regeneration vessel may take on substantially any shape, cylindrical, tapered or bud vase shaped as shown in the drawing or a combination thereof which will provide the restricted operating parameters of the invention as herein defined.

The regenerating technique and system or apparatus of this invention relies upon forming an initial high mix temperature of at least 1175° F., comprising hot regenerated catalyst particles and coke deactivated catalyst to initiate coke burning at the elevated temperature conditions upon contact with regeneration oxygen containing gas. A dense and dispersed catalyst phase regeneration system promoting the combustion of carbonaceous material and conversion of formed CO to $CO_2$ is particularly promoted and the recovery of heat thus generated is absorbed by catalyst particles dispersed therein. In this combination the combustion gas-catalyst particle suspension discharged from the upper end of the riser regeneration zone will normally reach a temperature of at least about 1350° F. and as high as 1400° F. or 1600° F. In such a system the first oxygen containing regeneration gas stream is introduced in the first riser catalyst mix zone discharging into the bottom or lower portion of a relatively large mass of catalyst in a dense fluid bed condition in the lower portion of the regeneration zone. Secondary regeneration gas is introduced to a lower portion of the cross sectional area of the large mass of dense fluid catalyst in regeneration section as required to complete combustion of combustibles and transport catalyst upwardly through the dispersed phase section of the regeneration zone. One or more downstream regeneration gas inlets are also provided for use as required to promote a more complete combustion of CO and coke deposits. Preheating of the primary as well as the secondary regenerated gas streams is desirable with the low coke producing crystalline zeolite catalyst so that an initial catalyst mix temperature of at least 1175° F. in the dense fluid bed of catalyst will be more easily attained.

In the arrangement of the present invention it is contemplated supplementing residual carbonaceous material such as coke transferred to the regeneration system by the introduction of torch oil. In a particular aspect it is contemplated adding torch oil to the spent catalyst passed to the riser mixing zone or the torch oil may be added with the air passed to the riser mixing zone. It also is contemplated adding the torch oil to an air line burner exit to aid with vaporization of the torch oil. On the other hand, a second torch oil vaporizer may be separately employed for injecting torch oil at spaced apart intervals across a lower portion of the dense fluid bed of catalyst to be regenerated. It is preferred in the combination operation of this invention to inject the torch oil to the riser mixing zone along with regeneration air as more specifically shown in the drawing.

The regenerating technique of the present invention relies upon a particular relationship of operating parameters which will accomplish the removal of carbonaceous deposits down to at least 0.05 weight percent and preferably as low as about 0.03 weight percent or lower in combination with limiting the amount of carbon monoxide in the combustion flue gases not to exceed about 0.15 mole percent. Thus it is essential to the processing concepts of this invention to rapidly initiate burning of deposited carbonaceous material at an elevated temperature of at least about 1175° F. with an amount of oxygen containing regenerating gas such as air providing a catalyst temperature rise of at least about 100 degrees and preferably sufficient to heat the catalyst particles carried through the regeneration system to an elevated temperature of at least 1300° F. Furthermore, to reap the advantage of the heat generated in the system, the regeneration gas flow rate is selected to provide a density or concentration of catalyst particles in the enlarged bottom portion of the regeneration zone within the range of 10 to 40 lbs/cu.ft. and in the upper most dispersed catalyst phase section thereof at a catalyst particle concentration below 8 lbs/cu.ft. and preferably below 2 lbs/cu.ft.

The contact time-temperature span relationship of the present invention required to burn combustible materials is spread over the sequence of catalyst phases in the regeneration operation in a manner taking full advantage of each operating phase to achieve the burning of combustibles and more efficient recovery of available heat generated in the catalyst phases. Furthermore, the operating controls and arrangement of apparatus is selected to provide the desired mixing of spent catalyst with hot regenerated catalyst in an amount to more particularly optimize the regeneration operation. In this operating environment it is important to maintain a proper pressure balance between vessels to achieve desired catalyst flow. That is, the pressure in the reactor side of the apparatus of the figure may be maintained relatively high to achieve transfer of catalyst from the stripper to the inlet of the riser mixer. On the other hand, the stripper adjacent the riser reactor may be at a higher elevation in order to develop a necessary pressure head for transferring catalyst as desired from the stripper to the riser mixer. Of course, a combination of reactor pressure and vessel height may be employed to achieve the results desired.

In yet another embodiment, for ease of fabrication, the bulb portion of the riser regenerator may comprise upper and lower conical sections separated by a cylindrical section of a diameter sufficient to maintain a dense fluid catalyst bed phase therein. In still another embodiment it is contemplated employing a relatively uniformly diverging upper section extending above said cylindrical section for restricting the upwardly flowing dispersed catalyst phase herein described.

It will be recognized from the above discussion that a relatively delicate balance in operating parameters is maintained to obtain a desired coke burning and removal thereof without producing undesired oxygen and carbon monoxide concentrations in the combustion flue gases and these operating restrictions are dictated in substantial measure by the ratio of hot regenerated catalyst that can be mixed with spent catalyst obtained from hydrocarbon conversion. For example, it has been observed that low initial catalyst mix ratios of regenerated catalyst to spent catalyst are accompanied by high concentrations of carbon monoxide and oxygen being emitted from the regenerator riser to the outlet cyclones. However, as the carbon on spent catalyst is increased by a change in feed reaction conditions etc. or by the addition of torch oil, for example, in the regeneration system, the mix ratio of regenerated catalyst to spent catalyst must be adjusted as required to provide the desired temperature profile in the regenerator.

BRIEF DESCRIPTION OF THE DRAWING

The FIGURE presents diagrammatically in elevation one arrangement of apparatus for accomplishing the catalytic conversion of hydrocarbons and the regeneration of catalyst particles in an upflowing catalyst regeneration system wherein an upflowing relatively dense fluid mass of catalyst charged with a high temperature catalyst mixture is transformed into a higher temeprature more dispersed catalyst phase regeneration operation before separation of flue gases of restricted low CO content from regenerated catalyst particles is accomplished.

DISCUSSION OF SPECIFIC EMBODIMENT

Referring now to the drawing, a hydrocarbon feed such as a gas oil boiling range feed is introduced by conduit 2 to the bottom of a riser conversion zone 4. Hot regenerated catalyst in conduit 5 provided with flow control valve 8 enters the bottom portion of riser 4 for admixture with the oil feed to form a catalyst-oil suspension at an elevated conversion temperature of at least about 850° F. and more usually at least 1000° F. Additional gasiform reactant material comprising $C_5$ and lighter hydrocarbons, alcohols, ethers and combinations thereof may also be introduced with the gas oil feed. The suspension of hot catalyst of regeneration in hydrocarbon material thus formed is passed upwardly through the riser conversion zone under high temperature hydrocarbon conversion conditions of at least 980° F. promoting the cracking of the gas oil feed to lower and higher boiling products including carbonaceous material deposited on the catalyst. The products include gasoline, fuel oils and normally gaseous hydrocarbon products. The hydrocarbon feed with suspended catalyst particles may be maintained in the riser conversion zone for a hydrocarbon residence time within the range of 1 to 10 seconds. However, a hydrocarbon residence time within the range of 0.5 to 4 seconds may be employed with particular advantage when using hydrocarbon conversion temperatures above 1000° F. and up to about 1100° F. Spaced apart hydrocarbon feed inlets 2' and 2'' are provided in riser 4 for the introduction of hydrocarbon feed material of the same, higher or lower boiling range. The suspension passed upwardly through riser 4 is discharged from the upper end of the riser conversion zone into two or more cyclonic separating means 14 and 14' as shown. Stripping gas and stripped hydrocarbons pass through cyclonic separating means 16. Of course cyclone separators 14 and 16 may each be a plurality of cyclonic separation means suitably connected to accomplish the results desired with respect to controlling the residence time the hydrocarbon contacts the catalyst. Gasiform hydrocarbon material and stripping gas obtained as provided below is withdrawn by conduits 18 and 20 communicating with plenum chamber 22 and withdrawal conduit 24. Conduit 24 communicates with product separation equipment not shown. Catalyst particles separated by a velocity reduction in the enlarged vessel arrangement and by cyclonic means are collected as a bed of catalyst 26 which moves downwardly through an annular stripping vessel about a substantial portion of the riser reactor and countercurrent to rising stripping gas such as steam or other suitable inert stripping gas introduced by conduit 28. The stripping gas maintains the bed of catalyst 26 in a dense fluid condition as it moves generally downward. The stripping gas removes entrained hydrocarbon vapors and other strippable material from the catalyst as the catalyst moves downwardly through the stripping zone. Stripped catalyst is withdrawn by standpipe 30 provided with flow control valve 32 and is passed to the bottom portion of a riser mixing-catalyst regeneration zone 34. Riser mixer 34 herein described discharges into the lower portion of a dense fluid bed or mass of catalyst to be regenerated as herein provided. Regenerated catalyst obtained as hereinafter defined, withdrawn by standpipe 36 and provided with flow control valve 38 communicates with the lower portion of riser 34 and provides hot regenerated catalyst at a temperature of at least 1300° F. for mixing with the spent catalyst at a lower temperature in the range of about 850° F. up to about 1000° F. to form a catalyst mixture of at least 1175° F. This mixture is conveyed with air or oxygen supplemented regeneration gas through riser mixer 34 for discharge into the lower portion of a dense fluid bed of catalyst 35 in the bulb portion of the regeneration zone.

In an enlarged settling section comprising the upper portion of the regenerator vessel about the upper discharge end of riser 46 a dense fluid bed of regenerated catalyst comprising the hot freshly regenerated catalyst particles recovered from the dispersed phase regeneration section is maintained in a dense fluid bed condition by a hot fluidizing gas such as a hot $CO_2$ rich product gas, an oxygen containing gas or other suitable gases added by conduits 39 and 41.

In the bottom enlarged bulb portion of the catalyst regenerator, a relatively large dense fluid bed or mass of catalyst particles is maintained under catalyst regenerating temperature conditions generally about 1200° F. and a concentration of catalyst particles in the catalyst phases within the range of 10 to 40 lb/cu.ft. and more usually at least 30 lbs/cu.ft. A first regeneration gas stream 44 comprising air or oxygen enriched gaseous material is introduced to the bottom portion of riser 34 for admixture with the catalyst streams in conduits 30 and 36 introduced thereto. Heating of the regeneration gas or air stream introduced by conduits 40, 42 and 44 in equipment not shown is preferred. Thus with a spent catalyst temperature of about 960° F. and containing 0.9 wt.% carbon thereon, it is desirable to preheat the regeneration gas to about 325° F. and mix a 1 to 1 ratio of spent catalyst in conduit 30 to recycle regenerated catalyst in conduit 36 at a temperature of at least about 1350° F. In the dense fluid bed of catalyst, the temperature of the bed is caused to be elevated by the burning of carbonaceous material with introduced oxygen containing regeneration gas. Furthermore, combustion of carbonaceous material is rapidly initiated by the hot catalyst mix distributed into the lower dense bed of catalyst with oxygen containing combustion gases by the outlet of mixing zone 34. Transporting the catalyst overhead from the dense catalyst through the dispersed catalyst phase regeneration section completes the removal of carbonaceous deposits within the processing limits selected and desired, transform carbon monoxide to carbon dioxide and produces a less dense catalyst-combustion gas suspension temperature of at least 1350° F. and preferably at least about 1375° F. As mentioned above, the concentration of catalyst particles in the upwardly flowing suspension is generally decreased in the direction of flow although it not necessarily need be depending on gas velocity conditions employed to produce catalyst particle concentrations in suspending flue gases below 5 lbs/cu.ft. before discharge from the riser regenerator into an enlarged catalyst separation zone. In any event the dispersed suspended catalyst phase passing into the enlarged settling zone is preferably less than 3 lbs/cu.ft. whether or not cyclonic separators are employed. Higher concentrations of catalyst particles can be employed with cyclonic separating means.

The catalyst combustion gas suspension is discharged in a specific arrangement from the upper end of riser regenerator 46 through a plurality of outwardly extending arm means open on the bottom side or provided with downwardly facing openings promoting the separation of catalyst particles from flue gases.

Additional oxygen containing gas such as air may be added to the upflowing suspension in riser 46 by one or more spaced inlets represented by conduit 48. The catalyst-combustion gas suspension passed upwardly through the restricted cross-sectional regeneration zone or riser 46 discharges against the upper closed end 50 which deflects the suspension outwardly through the plurality of elongated peripheral slots or arm means with openings facing downwardly into the enlarged settling section 53 of vessel 52. Discharging the suspension into the enlarged zone 53 lowers the velocity of the suspension thereby causing the catalyst particles to settle out and separate from flue gases. In settling zone 53 a major portion of the catalyst particles separate from the combustion flue gases before the flue gases pass through a plurality of cyclone separators represented by separators 54 and 56. Combustion flue gases comprising carbon dioxide rich gases are removed from separators 54 and 56 by conduits 58 and 60, plenum chamber 62 and withdrawal conduit 64.

Catalyst particles separated at an elevated regeneration temperature up to as high as 1600° F. as above identified are collected as an annular dense fluid bed of catalyst 66 about an upper portion of regenerator riser 46. The regenerated catalyst thus collected is withdrawn by standpipes 5 and 36 for use as herein discussed without significant cooling thereof. The catalyst in conduit 5 may be stripped in an external stripper not shown, if desired.

The catalyst regeneration method and system of the present invention is unique over that of the known prior art by at least the riser mixing of hot freshly regenerated catalyst with coke contaminated catalyst separated from the conversion zone in an amount sufficient to provide an elevated mix temperature of at least 1175° F. This high temperature mix of catalyst is sufficient for promoting the combustion of carbonaceous deposits in the presence of added oxygen containing regeneration gas such as air in an initial riser contact zone and the conversion of formed carbon monoxide to carbon dioxide is particularly promoted on a once through basis in the upflowing suspended catalyst atmosphere thereabove varying in particle concentration or density from about 40 lb/cu.ft. down to about 3 lbs/cu.ft. and less.

Having thus generally described the invention and discussed specific embodiments in support thereof, it is to be understood that no undue restrictions are to be imposed by reasons thereof.

I claim:

1. Apparatus for effecting the regeneration of fluid catalyst particles which comprises, a first riser means of larger diameter in the lower bottom portion thereof than the portion thereabove, a second riser means terminating in the said lower bottom portion of said first riser means, said second riser means being capped at its upper end and provided with a plurality of vertical elongated adjacent slots in the upper periphery thereof, said first riser means extending upwardly into and discharging into an enlarged catalyst collecting chamber, open ended first conduit means provided with valve means extending from a bottom portion of said catalyst collecting chamber to a bottom portion of said second riser means, second conduit means connected to the bottom portion of said second riser means for transfer of coke contaminated catalyst particles thereto, third conduit means for withdrawing regenerated catalyst from a bottom portion of said catalyst collecting chamber, and cyclonic separating means positioned in an upper portion of said catalyst collecting chamber in open communication with means for withdrawing gasiform material from an upper portion of said catalyst collecting chamber.

2. The apparatus of claim 1 wherein a plurality of arms extend radially from the upper discharge end of said first riser means and each arm discharges a suspension of catalyst and gaseous material generally downward in said catalyst collecting chamber.

3. Apparatus for effecting the regeneration of fluid catalyst particles which comprises,
- a first riser means of larger diameter in the lower bottom portion thereof than the portion thereabove,
- a second riser means terminating in the said lower bottom portion of said first riser means, said second riser means being capped at its upper end and provided with radial discharge means at the upper periphery thereof arranged to discharge laterally into the bottom portion of said first riser means, said first riser means extending upwardly into and discharging into an enlarged catalyst collecting chamber, open ended first conduit means provided with valve means extending from a bottom portion of said catalyst collecting chamber to a bottom portion of said second riser means, second conduit means connected to the bottom portion of said second riser means for transfer of coke contaminated catalyst particles thereto, third conduit means for withdrawing regenerated catalyst from a bottom portion of said catalyst collecting chamber, and cyclonic separating means positioned in an upper portion of said catalyst collecting chamber in open communication with means for withdrawing gasiform material from an upper portion of said catalyst collecting chamber.

4. The apparatus of claim 3 wherein a plurality of arms extend radially from the upper discharge end of said first riser means and each arm discharges a suspension of catalyst and gaseous material generally downward in said catalyst collecting chamber.

* * * * *